United States Patent [19]
Verdun

[11] Patent Number: 5,623,649
[45] Date of Patent: Apr. 22, 1997

[54] METHOD AND APPARATUS FOR PASSING A BUS CLOCK SIGNAL FROM A COMPUTER TO AN EXPANSION CHASSIS

[75] Inventor: Gary J. Verdun, Belton, Tex.

[73] Assignee: Texas Instruments Incorporated, Dallas, Tex.

[21] Appl. No.: 551,189

[22] Filed: Oct. 31, 1995

[51] Int. Cl.⁶ .................................................... G06F 1/10
[52] U.S. Cl. ............................................ 395/558; 327/165
[58] Field of Search ...................................... 395/550, 551, 395/558, 281, 282; 375/226, 359, 362, 371, 373, 376; 331/1 R, 25, 68; 307/89; 327/5, 165

[56] References Cited

U.S. PATENT DOCUMENTS

| | | | |
|---|---|---|---|
| 4,208,724 | 6/1980 | Rattingourd | 364/DIG. 2 |
| 4,490,821 | 12/1984 | Lacher | 364/DIG. 2 |
| 5,359,727 | 10/1994 | Kurita et al. | 395/550 |

OTHER PUBLICATIONS

CGS701V Commercial Low Skew PLL 1 to 8 CMOS Clock Driver Data Sheet, National Semiconductor Corporation, (Aug. 1994).

Optimizing for Low Skew and Phase Error on PLL Based Clock Generators, Application Note 968, Rahim Ahmed and Louis Malarsie, National Semiconductor (Dec. 1994).

*Primary Examiner*—Thomas M. Heckler
*Attorney, Agent, or Firm*—Ronald O. Neerings; James C. Kesterson; Richard L. Donaldson

[57] ABSTRACT

A computer (10) is coupled to an expansion chassis (12) containing one or more bus devices (18). A bus clock signal is passed to the expansion chassis (12) through connector (14). The bus clock signal received by the expansion chassis may be skewed from the original clock signal, due to conditioning to reduce EMI, or other filters. A clock regeneration circuit (20) produces a new clock signal for the bus devices which is in phase with the clock signal generated in the computer (10).

20 Claims, 2 Drawing Sheets

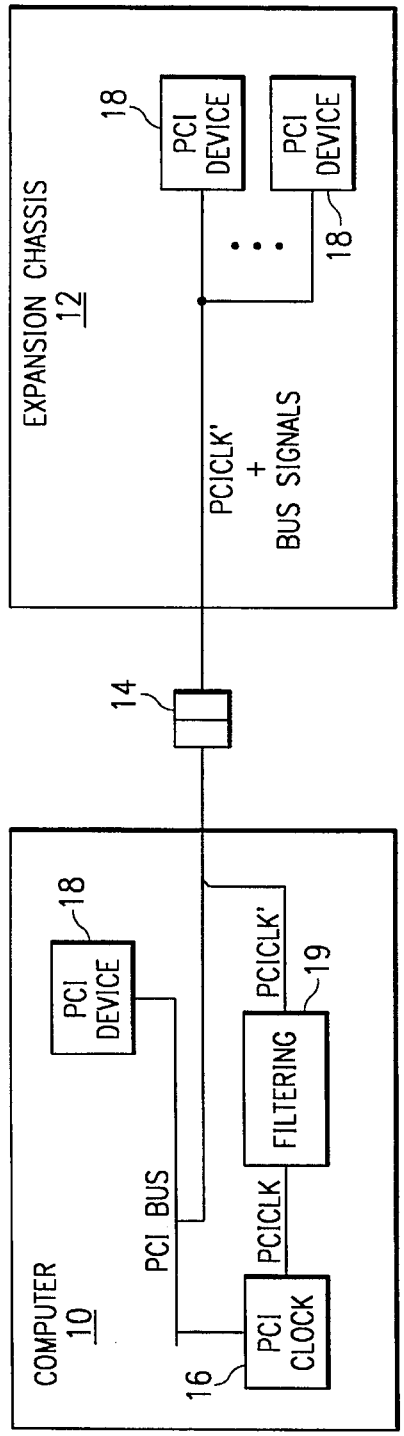
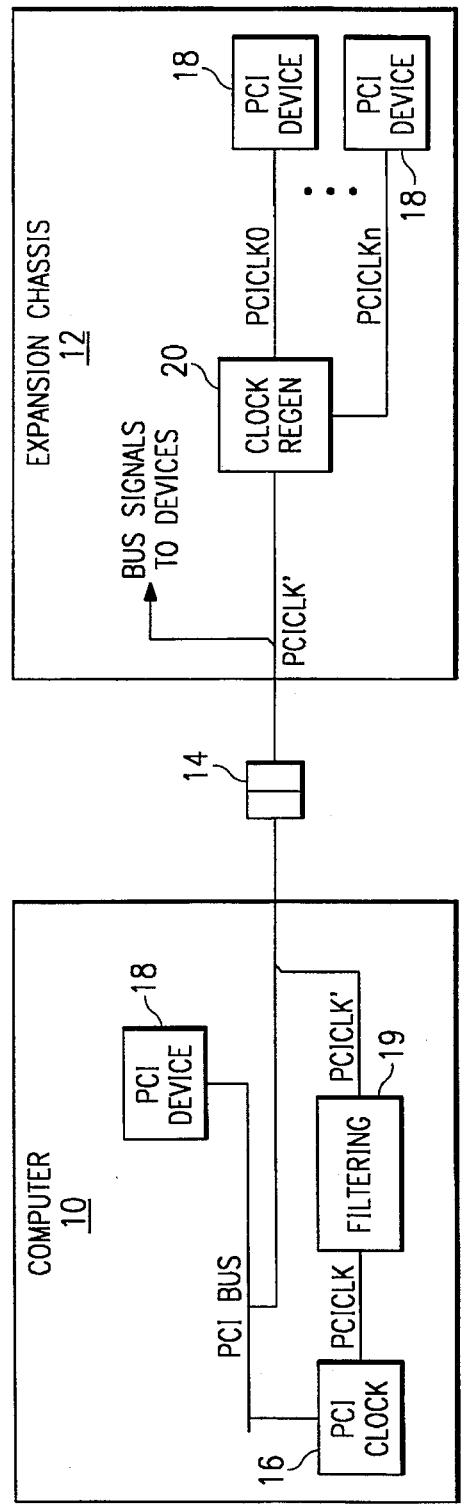

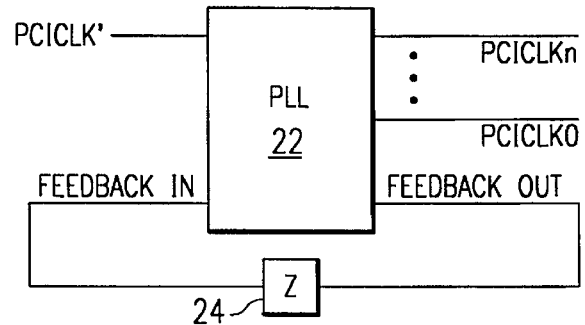
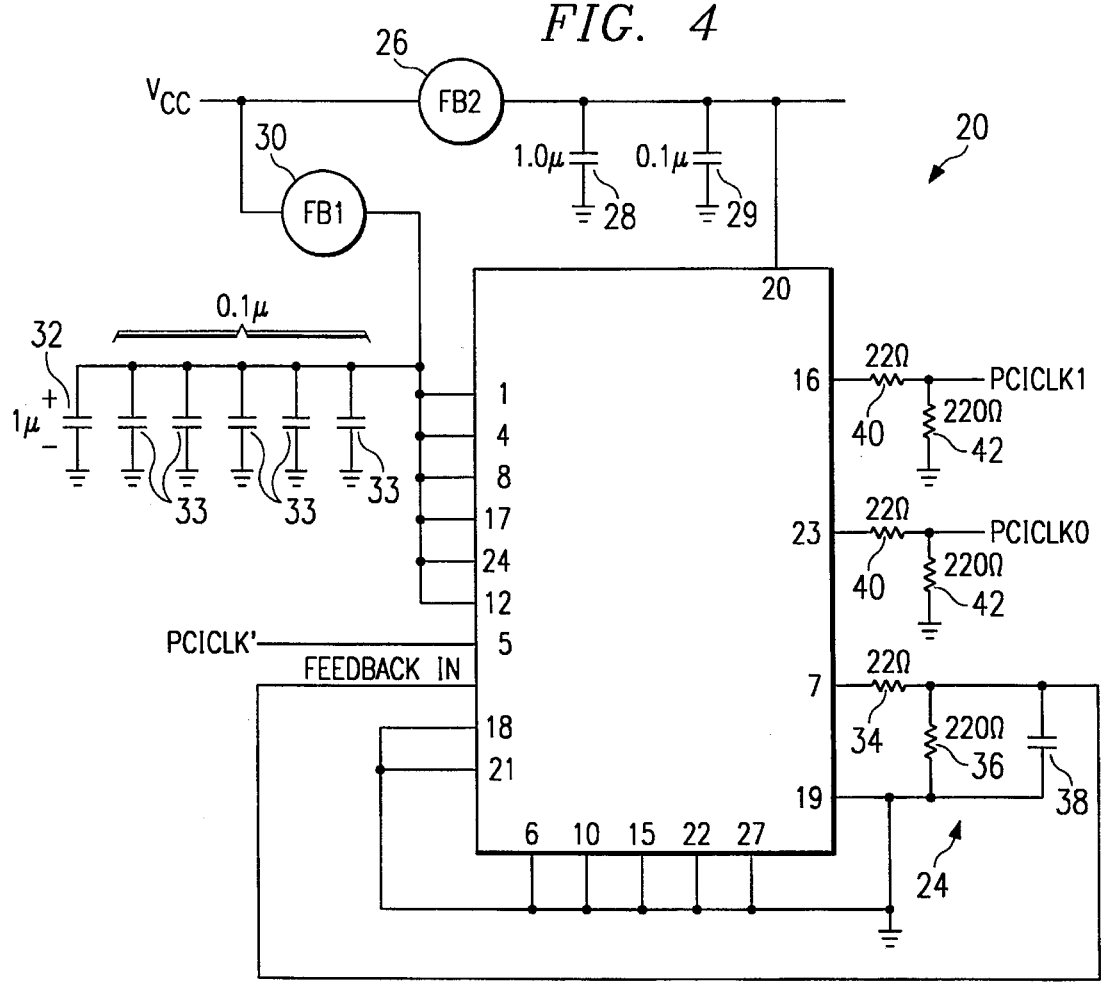

METHOD AND APPARATUS FOR PASSING A BUS CLOCK SIGNAL FROM A COMPUTER TO AN EXPANSION CHASSIS

TECHNICAL FIELD OF THE INVENTION

This invention relates in general to computers and, more particularly, to a method and apparatus for pass a bus clock signal from a computer to an expansion chassis.

DESCRIPTION OF RELATED ART

In the portable computing industry, it is very desirable to provide an expansion chassis for connecting to a portable computer, as shown in FIG. 1. The computer 10 is coupled to the expansion chassis 12 through connector 14. A number of bus signals are passed through connector 14 from the computer 10, including one or more clock signals from bus clock circuitry 16. The system bus in the computer 10, which is coupled to one or more PCI devices 18, also receives a bus clock signal. In FIG. 1, the bus clock is shown as a PCI (Peripheral Connect Interface) clock, PCICLK; while the present specification describes a system using a PCI bus, it should be noted that any type of bus architecture can be used.

The expansion chassis includes a number of bus devices, shown as PCI devices 18. The PCI devices 18 in the expansion chassis may include, for example, PCI—PCI bridges, PCI-ISA (Industry Standard Architecture) bridges, PCI-SCSI (Small Computer Serial Interface), network interfaces, and so on.

PCI devices 18 typically require a dedicated clock to each device. In order to ensure proper communications between devices, the PCI specification requires that the skew between the clocks dedicated to any two PCI devices 18 be no greater than two nanoseconds for a bus speed of 33 MHz. Narrower skew requirements are specified for higher clock speeds, such as 66 MHz. A number of factors involved in providing the connection between the computer 10 and expansion box 12 cause propagation delays and phase shifts which can push the skew beyond the stated maximum skew.

First, the connector 14 is a source of electromagnetic emissions. In order to reduce the electromagnetic interference (EMI) cause by a clock signal passing through the connector 14, the clock signal can be conditioned by a low pass filter 19 to round off the corners of the square wave clock signal. The circuitry for conditioning the clock signal, however, will necessarily introduce phase shifts, which increase the skew.

Second, where multiple PCI devices exist on the expansion chassis 12, each PCI clock signal will increase the EMI. Consequently, the need to condition the clock signals in increased. Further, each clock signal passed through the connector 14 will require three or four pins for proper grounding; consequently, passing multiple clock signals requires numerous pins on the connector 14.

Accordingly, a need has arisen for a method and apparatus for providing clean, accurate clock signals to an expansion chassis.

SUMMARY OF THE INVENTION

Clock signals are passed from a computer to an expansion chassis using a clock for generating a bus clock signal in the computer. A filter is coupled to the clock for generating a filtered bus clock signal. A clock regeneration circuit in the expansion chassis generates a clock signal substantially in phase with the bus clock signal responsive to the filtered bus clock signal.

The present invention provides significant advantages over the prior art. First, it can significantly reduce, or eliminate, any skew between bus clocks in the computer and bus clocks passed to the expansion chassis. Second, it can restore square waves from the filtered waves, thereby allowing greater conditioning to reduce EMI as the clocks are passed from the computer to the expansion chassis. Third, a single clock can be passed from the computer to the expansion chassis, where multiple dedicated clocks can be generated for the bus devices in the expansion chassis.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a block diagram of a prior art connection between a computer and an expansion chassis;

FIG. 2 illustrates a block diagram of a connection between a computer and an expansion chassis with a bus clock regeneration circuit;

FIG. 3 illustrates a block diagram of a preferred embodiment of the bus clock regeneration circuit of FIG. 2; and FIG. 4 illustrates a block diagram of a schematic representation of the bus clock regeneration circuit of FIG. 3.

DETAILED DESCRIPTION OF THE PREFERRED EMBODIMENT

The present invention is best understood in relation to FIGS. 1–4 of the drawings, like numerals being used for like elements of the various drawings.

FIG. 2 illustrates a block diagram of a preferred embodiment of a connection between a computer and an expansion chassis using a bus clock regeneration circuit 20. The computer includes a PCI bus coupled to one or more PCI devices 18, such as video controllers or input/output circuitry. The computer 10 also includes circuitry for generation of a clock signal to the computers internal bus and a single PCI clock signal (PCICLK) which is passed through filter 19 and connector 14. For purposes of illustration filter 19 could comprise an circuitry or conditions (such as capacitance) which introduces phase shift or propagation delay into PCICLK. While filter 19 is shown as part of the computer 10, it is considered inclusive of any phase shift or propagation delay occurring between the PCI clock circuitry 16 and the PCI devices 18.

The expansion chassis, including a plurality of PCI devices 18, is coupled to the other side of the connector 14. The signal on the expansion chassis side of connector 14 is labeled PCICLK', to account for any phase shifts or propagation delays which may have occurred due to clock conditioning circuitry or otherwise. Also, the shape of PCICLK' may vary from PCICLK in shape due to conditioning for EMI. A clock regeneration circuit 20 receives PCICLK' and outputs a regenerated clock signal to the PCI devices 18.

As described above, filter 19 rounds the corners of PCI-CLK in order to reduce EMI. Because the other bus signals, such as the address and data signals do not change on a regular frequency, they do not present significant EMI problems, and do not need to pass through filter 19. As is known in the art, filter 19 can be implemented as a low pass filter.

Although FIG. 2 illustrates an embodiment incorporating a PCI bus, it should be noted that the clock regeneration circuit can be used in connection with any bus architecture where skewing between clock signals must be minimized for proper operation.

It should further be noted that computer 10 could be a desktop or portable computer. Expansion chassis 12 could be, for example, a docking station for a portable computer (for allowing additional devices such as a CD-ROM or network cards to be connected to the computer) or an expansion bus for providing additional bus slots for a desktop computer.

In operation, the clock regeneration circuitry 20 compensates for any phase shift or propagation delay, resulting in skew between PCICLK and PCICLK'. The skew between PCICLK and PCICLK' will, under almost all circumstances, be static (i.e., it will not vary significantly during operation of the computer 10) and process invariant (i.e., it will not vary significantly from machine to machine due to manufacturing variations). Accordingly, the output of the clock regeneration circuitry can be designed to introduce a leading or lagging phase shift into PCICLK0–PCICLKn so that they are almost exactly in phase with PCICLK.

In addition, in the preferred embodiment, the clock regeneration circuit 20 also acts to restore each output clock to a square wave, so that PCICLK0–PCICLKn are each almost exact, in-phase, duplicates of PCICLK. Because the clock regeneration circuit 20 thus allows greater conditioning to be performed on the output of the PCI clock circuitry, thereby further reducing EMI, if desired.

Also, in the preferred embodiment, the clock regeneration circuit 20 is operable to generate multiple copies of the regenerated clock signal to respective PCI devices 18.

A block diagram of a preferred embodiment of the clock regeneration circuit 20 is shown in FIG. 3. A phase locked loop circuit 22 is coupled to a impedance circuit 24. Phase locked loop circuits are well known in the art; the phase locked loop circuit could be any one of a number of commercially available integrated circuits, such as the CGS701V Commercial Low Skew PLL 1 to 8 CMOS Clock Driver manufactured by NATIONAL SEMICONDUCTOR.

In operation, the PLL will output one or more clock signals (PCICLK0–PCICLKn) responsive to (1) the input clock signal (PCICLK') and (2) a feedback signal (FEEDBACK IN). The PLL will attempt to minimize the phase difference between PCICLK' and FEEDBACK IN. The loop is locked when both the rising and trailing edges of PCICLK' and FEEDBACK IN are aligned and have the same frequency.

In the illustrated embodiment of FIG. 3, the feedback signal is set to the FEEDBACK OUT signal as modified by an impedance circuit 24. The FEEDBACK OUT signal is a signal in phase with the PCICLK' signal. The impedance circuit 24 generally comprises an RC circuit for providing a lagging phase shift to the FEEDBACK OUT signal. Consequently, the PLL will compensate for the lagging phase shift induced by the impedance circuit by adding a leading phase shift to its output clocks (including the FEEDBACK OUT signal), such that FEEDBACK IN is in phase with PCICLK'.

While the resistor and capacitance values for the RC circuit can be calculated for a given lag according to well known formulas, the values can also be determined fairly easily by probing PCICLK at the output of the PCI clock circuitry 16 and one of the PCICLK outputs of the PLL. The value of the capacitor in the RC circuit can be varied until the two signals are in phase.

FIG. 4 illustrates an embodiment of the clock regeneration circuit 20, using the CGS701V circuit referenced above. Pin <20> (analog Vcc) is coupled to Vcc through ferrite bead 26. Ferrite bead 26 prevents feedback to system Vcc which could affect the operation of other components. A 1 µF (microfarad) capacitor 28 and a 0.1 µF capacitor 29 are coupled in parallel between pin <20> and ground. A second ferrite bead 30 is coupled between Vcc and pins <1,4,8, 17,24> (digital Vcc) and <12> (output tri-state control). A 1 µF (microfarad) capacitor 32 and five 0.1 µF capacitors 33 are coupled in parallel between pins <1,4,8,12,17, and 24>, and ground. Pins <6,10,15,22 and 27> (digital ground) and pin <19> (analog ground) are coupled to system ground along with pins <18> skew test pin> and <21> (external clock MUX selector). The PCICLK' signal is coupled to pin <5> (crystal oscillator input). Pin <7> (FEEDBACK OUT) is coupled to pin <2> (FEEDBACK IN) through twenty two ohm resistor 34. A two hundred twenty ohm resistor 36 and a capacitor 38 are coupled between pin <2> and ground.

Pins <9,11,14,16, and 23> comprise the 1× clock outputs of the CGS701V. As many of these pins as desired may be used as in-phase clock signals. In the illustrated embodiment of FIG. 4, each used output is coupled to a voltage divider comprising a two hundred twenty ohm resistor 40 and a twenty two ohm resistor 42. The voltage dividers lower the voltage swing at the output and eliminate direct current (DC) offset. Accordingly, both EMI and noise margin are improved.

In operation, the capacitor value can be set empirically to overcome a known lag.

The present invention provides significant advantages over the prior art. First, it can significantly reduce, or eliminate, any skew between bus clocks in the computer and bus clocks passed to the expansion chassis. Second, it can restore square waves from the filtered waves, thereby allowing greater conditioning to reduce EMI as the clocks are passed from the computer to the expansion chassis. Third, a single clock can be passed from the computer to the expansion chassis, where multiple dedicated clocks can be generated for the bus devices in the expansion chassis.

Although the Detailed Description of the invention has been directed to certain exemplary embodiments, various modifications of these embodiments, as well as alternative embodiments, will be suggested to those skilled in the art. For example, the present invention will work with any number PLL circuits, either commercially available or custom design. Further, while exemplary values have been provided for components, other values may be used which will provide similar results.

The invention encompasses any modifications or alternative embodiments that fall within the scope of the Claims.

What is claimed is:

1. A system for passing a clock signal from a computer to an expansion chassis comprising:

a clock for generating a bus clock signal in the computer;

a filter coupled to said clock for generating a filtered bus clock signal;

a clock regeneration circuit in said expansion chassis for generating one or more expansion chassis clock signals substantially in phase with said bus clock signal responsive to said filtered bus clock signal.

2. The system of claim 1 wherein said clock regeneration circuit comprises a phase locked loop circuit.

3. The system of claim 2 wherein said phase locked loop circuit includes a load defining a desired phase shift to be applied to said filtered clock signal.

4. The system of claim 1 wherein said filter comprises a filter for reducing electromagnetic interference.

5. The system of claim 1 wherein said computer comprises a portable computer.

6. The system of claim 5 wherein said expansion chassis comprises a docking station for said portable computer.

7. The system of claim 1 wherein said computer comprises a desktop computer.

8. The system of claim 7 wherein said expansion chassis comprises an expansion bus for providing additional bus slots.

9. A computer system comprising:

a computer including a clock circuit for generating a first bus clock signal and a filter for generating a modified bus clock signal, said modified bus clock signal being outside of a predetermined phase differential with said first clock signal; and an expansion chassis including a clock regeneration circuit for generating a second clock signal responsive to said modified clock signal, such that said second clock signal is within a predetermined phase differential with said first clock signal.

10. The computer system of claim 9, wherein said clock regeneration circuit comprises a phase locked loop circuit.

11. The computer system of claim 10 wherein said phase locked loop circuit includes a load defining a desired phase shift to be applied to said filtered clock signal.

12. The computer system of claim 9 wherein said filter comprises a filter for reducing electromagnetic interference.

13. The computer system of claim 12 wherein said filter comprises a low pass filter.

14. The computer system of claim 9 wherein said computer comprises a portable computer.

15. The computer system of claim 14 wherein said expansion chassis comprises a docking station.

16. The computer system of claim 9 wherein said computer comprises a desktop computer and said expansion chassis comprises an expansion bus for providing additional bus slots.

17. A method of communicating between a computer and an expansion chassis comprising the steps of:

generating a first bus clock signal in the computer for controlling the timing of devices in the expansion chassis;

filtering the first bus clock signal to generate a filtered bus clock signal to pass to the expansion chassis; and generating one or more second bus clock signals responsive to said filtered bus clock signal, such that said second bus clock signal is within a predetermined phase differential from said first bus clock signal.

18. The method of claim 17 wherein said step of generating one or more second bus clock signals comprises the step of generating one or more second bus clock signals using a phase locked loop circuit.

19. The method of claim 17 wherein said filtering step comprises the step of applying a filter to lower electromagnetic interference associated with said first bus clock.

20. The method of claim 17 wherein said step of generating one or more second bus signals comprises the step of generating a plurality of second bus clock signals responsive a single filtered bus clock signal.

* * * * *